United States Patent [19]

Dingwall et al.

[11] Patent Number: 5,307,188

[45] Date of Patent: Apr. 26, 1994

[54] COLOR LIQUID CRYSTAL DISPLAY WITH DEAD FRONT APPEARANCE HAVING OPAQUE MASK FORMED ON THE PRIMARY DISPLAY

[75] Inventors: Richard B. Dingwall, Rochester; Lowell W. Knapp, Victor; John H. Steele, Spencerport; James S. Celebi, Holcomb; Virgil J. Hull, Fairport, all of N.Y.

[73] Assignee: Xerox Corporation, Stamford, Conn.

[21] Appl. No.: 12,491

[22] Filed: Feb. 2, 1993

Related U.S. Application Data

[62] Division of Ser. No. 755,967, Sep. 6, 1991, Pat. No. 5,220,442.

[51] Int. Cl.⁵ .................... G02F 1/133; G02F 1/137
[52] U.S. Cl. ........................... 359/53; 359/67; 359/66; 359/68; 359/87
[58] Field of Search ................ 359/53, 67, 68, 63, 359/62, 87, 89, 66; 340/765, 784; 345/38, 50, 75, 87, 88

[56] References Cited

U.S. PATENT DOCUMENTS

| | | | |
|---|---|---|---|
| 3,886,014 | 5/1975 | Bayer | 359/89 |
| 4,294,524 | 10/1981 | Stolov | 359/68 |
| 4,403,216 | 9/1983 | Yokoi | 359/67 |
| 4,475,806 | 10/1984 | Daughton et al. | 355/14 R |
| 4,501,471 | 2/1985 | Culley et al. | 359/62 |
| 4,506,956 | 3/1985 | Dir | 359/63 |
| 4,516,834 | 5/1985 | Cascini | 359/53 |
| 4,519,679 | 5/1985 | Horikiri et al. | 359/67 |
| 4,527,864 | 7/1985 | Dir | 359/63 |
| 4,547,043 | 10/1985 | Penz | 359/53 |
| 4,560,241 | 12/1985 | Stolov et al. | 359/68 |
| 4,595,259 | 6/1986 | Perregaux | 359/67 |
| 4,610,507 | 9/1986 | Kamamori et al. | 359/64 |
| 4,637,687 | 1/1987 | Haim et al. | 359/53 |
| 4,690,511 | 9/1987 | Watanabe | 359/68 |
| 4,767,190 | 8/1988 | Dir et al. | 359/63 |
| 4,834,506 | 5/1989 | Demke et al. | 359/87 |
| 4,896,945 | 1/1990 | Ooba et al. | 359/92 |
| 4,917,465 | 4/1990 | Conner et al. | 359/53 |
| 4,927,240 | 5/1990 | Stolov et al. | 359/53 |
| 4,929,061 | 5/1990 | Tominaga et al. | 359/48 |

FOREIGN PATENT DOCUMENTS

| | | | |
|---|---|---|---|
| 0209439A1 | 1/1987 | European Pat. Off. | 359/53 |
| 3340468A1 | 5/1985 | Fed. Rep. of Germany | 359/53 |
| 1-161220 | 6/1989 | Japan | 359/53 |
| 2-137818 | 5/1990 | Japan | 359/63 |

*Primary Examiner*—William L. Sikes
*Assistant Examiner*—Tai V. Duong
*Attorney, Agent, or Firm*—Oliff & Berridge

[57] ABSTRACT

A liquid crystal display unit is provided which includes a primary, image-defining display and a secondary display, arranged in series with the primary display. The primary and secondary displays have equal numbers of light shutters, similarly sized and located on each display, so that when the corresponding light shutters on the primary and secondary displays are closed, substantially no light passes through the viewing side of the primary display. An opaque mask is formed on the input side of the primary display to define the shape of the image elements to be displayed. This mask covers the edges of the primary display light shutters to define the image elements display. This mask permits the primary and secondary displays to be easily aligned with each other. Color patches can be located on the light input side of the primary display light shutters so that the viewed images are in color. The use of the opaque mask to form the image elements eliminates the need to form precisely shaped color patches. Since and the mask blocks all light between light shutters, a display is provided having a true dead front. The true dead front display permits colored text displays using mimic-type electrodes to be produced. Since the secondary displays need not perform as well as the primary displays, displays which are not suitable for use as primary displays can be used as the secondary displays.

17 Claims, 6 Drawing Sheets

COLOR LIQUID CRYSTAL DISPLAY WITH DEAD FRONT APPEARANCE HAVING OPAQUE MASK FORMED ON THE PRIMARY DISPLAY

This is a Division of application Ser. No. 07/755,967, filed Sep. 6, 1991, now U.S. Pat. No. 5,220,442.

BACKGROUND OF THE INVENTION

1. Field of the Invention

The present invention is directed to liquid crystal display devices, and in particular, to color liquid crystal display devices having a dead front appearance, and to methods of making such liquid crystal displays. These displays are particularly useful when incorporated into control panels of larger machines such as, for example, copiers.

2. Description of Related Art

Liquid crystal devices are, in general, well known, and are frequently incorporated into control panels of larger machines (e.g., automobiles or automated office equipment) for conveying information regarding the status of the machine, or the location of components of the machine to an operator.

For example, the Xerox 4050 printer includes a control panel having a liquid crystal display (LCD) assembly that provides an illustration of the printer and its components, and an alphanumeric vacuum fluorescent display (VFD) that provides an operator with instructions or other information. The VFD and LCD assembly can be simultaneously controlled so that as the VFD provides an instruction involving the manipulation of some machine component (e.g., "fill tray 1 with paper" or "door is open"), that component (the tray or the door) is displayed on the LCD assembly.

U.S. Pat. No. 4,475,806 to Daughton et al discloses a copier display panel including a VFD and LCD assembly which are simultaneously controlled to permit an operator to interact with the copier. Accordingly, the disclosure of U.S. Pat. No. 4,475,806 is incorporated herein by reference.

FIG. 1 is an exploded view of the VFD and LCD assembly on the control panel of the 4050 printer. The VFD 110 and the LCD assembly 120 are mounted on a common mounting board 100. The LCD assembly 120 includes a lamp reflector and support housing 122 which is attached directly to the mounting board 100 with, for example, snap features. A fluorescent lamp 124 attached to a lamp housing/reflector 126 is mounted to the display console front bezel (not shown), and acts as the light source for the LCD assembly. A ground glass light diffuser 130 is placed in the lamp reflector and support housing 122 to provide a uniform amount of light to the entire LCD. A liquid crystal display glass 132 (described in more detail below) which includes a liquid crystal material sandwiched between two electrode-containing glass plates, a pair of polarizers, and a plurality of luminance balanced color patches encircled by a gray surround formed on one of the glass plates is placed over the light diffuser 130. The electrodes on the glass plates of display glass 132 are sized and shaped to define image elements, and include lead lines which provide electrical contact to a tape cable 128 by zebra strips 129. The tape cable is then connected to a controller for actuating the LCD electrodes. A machine outline overlay 134 is placed over display glass 132. Overlay 134 is a transparent mylar sheet having a white outline of the copier machine stenciled thereon. Front frame 136 is placed on overlay 134 and attached to support housing 122 by screws. Accordingly, light diffuser 130, LCD glass 132, zebra strips 129, tape cable 128, and overlay 134 are sandwiched between, and held in place by, front frame 136 and support housing 122.

Since the electrodes on the glass plates are the same size and shape as the image element that they define, they are known as "mimic" type electrodes. That is, they mimic the shape of their image element (e.g., a copier door, or a paper tray, etc.). A second type of electrode used in LCDs is the "bit" type. Bit type electrodes are small dots (or squares), each of which only defines a small part of an image element. Bit type electrodes are usually provided in matrices, in which a large number of bit electrodes must be activated at one time to light a large image element. Bit electrodes have the advantage of allowing the information in the display to be changed. However, bit electrode displays must usually be multiplexed. The electrical signals associated with multiplexing result in lower contrast ratios, restricted viewing angles, and longer response times. For applications such as office machines where the viewer is not in a fixed position, and in particular where a dead front is required, high contrast ratio and wide viewing angle are required. These requirements are best met by displays with mimic electrodes driven by individual electrical signals to each element. These signals allow the contrast ratio, viewing angle, and response time to be maximized.

The 4050 LCD assembly, and in particular the LCD glass 132, is constructed generally according to the teachings of U.S. Pat. Nos. 4,506,956 and 4,527,864 to Dir. The Dir patents disclose a multicolor display including a high contrast liquid crystal device, a light source, and a luminance balanced color mask. The liquid crystal device is the transmissive, twisted-nematic type having high extinction ratio polarizers on the input and output sides, and functions as a light shutter for the display. The liquid crystal material has a dichroic dye admixed therein to prevent buildup of contrast limiting orthogonal mode electric vector of polarized light. The color mask contains different colored patches with gray surround about them. Each colored patch is luminance balanced with each other and the gray surround in order that each different colored data presented are of substantial equal brightness. For a more detailed description of the problems addressed by the addition of dichroic dyes to liquid crystal materials, see U.S. Pat. Nos. 4,506,956 and 4,527,864 to Dir, the disclosures of which are incorporated herein by reference.

In the Dir patents, dichroic dyes are mixed with the liquid crystal material so as to absorb an orthogonal component of the light which would normally pass through the liquid crystal light shutter when in the off-state. (Light also leaks through the areas surrounding each light shutter (between the electrodes) where the liquid crystal material is permanently in the off-state.) Theoretically, the light shutters of Dir should have a high contrast ratio and produce a uniformly dark state or dead front when switched off. However, light continued to leak through the display of Dir even when in the off-state. Dichroic dyes do not perfectly absorb only a single polarization state of the transmitted light due to (1) the limited dichroic ratio of the dye itself, and (2) imperfect alignment of the dye in the liquid crystal host (order parameter). Because of this, the shutters, when switched on, have a lower transmittance than desired, requiring a high level of illumination. In addition, the optimum absorbance of the orthogonal component of light is obtained only at certain values of the thickness of the liquid crystal layer, depending on the birefringence of the dye/liquid crystal mixture, causing high tolerance requirements for constructing such a liquid crystal display with a uniform dead front (i.e., differences in the thickness of the liquid crystal material layer cause differences in the light transmission characteristics thereof). Additionally, the glass spacer rods inserted between the electrode containing glass plates of the light shutter provide a pathway for the transmission of light through the light shutter when in the off-state. Other contributors to bleed-through include defects in the liquid crystal alignment layer and errors in the rotational angle of the liquid crystal alignment layers and polarizers.

Accordingly, in order to de-emphasize (i.e., to make less visually noticeable) the leakage of light through the light shutters (and associated color patches) of the display, Dir provides a gray background surrounding the color patches, and luminance balances the color patches and gray surround. The luminance balancing makes it more difficult for a person to visualize the light bleeding through the color patches when in the off-state. Thus, the Dir display does not provide a true dead front since light does pass therethrough when in the off-state. Instead, Dir makes use of the threshold for detection of contrast of the human eye so that light bleeding through the color patches in the off-state is theoretically undetectable against the gray surround (through which some light also leaks).

While the 4050 LCD works fairly well in bright ambient lighting conditions, when the amount of ambient light is low, light bleeding through the color patches is noticeable by an operator. This leads to confusion since operators frequently believe that a component of the copier must be adjusted or serviced (since that component appears to be lighted in the LCD), when, in fact, no adjusting or servicing is required. Additionally, operators sometimes cannot determine which components require servicing because multiple components on the LCD appear to be lighted.

The luminance balancing technique for providing an apparent dead-front display also is not satisfactory when textual information is conveyed by the color liquid crystal light shutters. The nature of text requires that it be high contrast (against a background; such as black against white) rather than luminance balanced. That is, colored-text (including white) is more easily readable when displayed against a dark background than when displayed against a partially lighted gray background. Furthermore, the spatial frequencies of text make it easily noticeable unless no light passes therethrough. Accordingly, the LCD in the 4050 printers does not include textual data.

A number of patents disclose LCD assemblies having two or more light shutters in series.

U.S. Pat. No. 4,917,465 to Conner et al discloses a color display system wherein three supertwisted nematic birefringent LCD panels are stacked together and tuned to a different primary color component (yellow, cyan or magenta). Several polarizers are interspersed within the stack of panels and at each end of the system. The polarizers may be colored in order to improve color and brightness. A "black" LCD in combination with the color LCDs is disclosed for improving the contrast ratio.

U.S. Pat. No. 4,547,043 to Penz discloses a stacked LCD graphics display wherein a series of LCDs are used to increase contrast ratio. Each of the LCDs receive identical driving signals. Each LCD modulates the incoming light by the same percentage.

U.S. Pat. No. 4,637,687 to Haim et al discloses a cascaded, dual cell transflective LCD wherein the two LCD cells improve the contrast ratio of the LCD in a transmissive and a reflective state. A transreflective element is placed between the cells. Additionally, the cell display segments (electrodes) of the rear cell can be made larger than the segments in the front cell.

U.S. Pat. No. 4,927,240 to Stolov et al discloses a multiple LCD wherein at least two twisted nematic LCDs are used to improve contrast ratio. A three cell LCD with two polarizers can theoretically have a contrast ratio of 8000:1. The use of a color or multicolor layer between each LCD is also disclosed.

U.S. Pat. No. 4,929,061 to Tominaga et al discloses a color LCD device wherein a liquid crystal panel has a plurality of primary color pixel components and a liquid crystal shutter associated with each primary color component. In addition, the device includes a back light unit which is placed behind the LCD. The panel, the shutters and the back light unit are all part of the same device.

U.S. Pat. No. 4,595,259 to Perregaux discloses a liquid crystal image bar for marking a photoreceptor. A light shield of an opaque metal or organic film is deposited on the inner face of one of the glass LCD substrates to block stray light from passing therethrough.

U.S. Pat. No. 4,834,506 to Demke et al discloses an LCD wherein inter-electrode spaces are made dark by printing a matrix of black lines wherever electrode material is removed from a glass substrate.

U.S. Pat. No. 4,896,945 to Ooba et al discloses a liquid crystal cell display wherein light shielding layers are formed between adjacent transparent electrodes.

The disclosures of the above-referenced patents are incorporated herein by reference.

OBJECTS AND SUMMARY OF THE INVENTION

It is an object of the present invention to provide a color liquid crystal display wherein substantially no light leaks through its light shutters when in the off-state so that the LCD has a true dead front appearance.

It is another object of the present invention to provide an LCD having a high contrast ratio suitable for displaying colored text, and which also does not confuse operators by appearing to be on when the light shutters are switched off.

It is another object of the present invention to provide a control panel having multiple display areas, at least some of the display areas having an LCD unit therein, which is aesthetically pleasing to view, and easy to read.

It is a further object of the present invention to provide a method of making an LCD assembly, having more than one light shutter arranged in series, that increases yield, thereby reducing costs.

To achieve the foregoing and other objects and to overcome the shortcomings discussed above, a liquid crystal display is provided which includes a primary, image-defining display and a secondary display, arranged in series. Each display includes one or more light shutters defined by two electrodes formed on two separate glass substrates which sandwich a liquid crystal material therebetween. The primary and secondary displays have equal numbers of light shutters, similarly sized and located on each display, so that when the primary and secondary displays are placed in series their respective light shutters are also in series.

When a light source is placed behind the secondary display, and a corresponding pair of light shutters on the primary and secondary displays are turned on, light from the source passes through both light shutters and can be viewed from the opposite side of the primary display. When corresponding light shutters on the primary and secondary displays are closed, substantially no light passes through the displays to the opposite side of the primary display.

An opaque black mask is formed on the input side of the primary display to define the size and shape of the image elements to be viewed. This black mask covers the edges of the primary display light shutters to define the image elements such that each light shutter on the secondary display is larger in size than its corresponding image element (i.e., the portion of the primary display light shutter covered by a color patch, but not by the black mask) on the primary display. This permits the primary and secondary displays to be easily aligned with each other. Additionally, color patches are located on the light input side of the primary display light shutters so that the viewable images are in color. Typically, a unique screen is constructed and carefully aligned to produce each color in the finished LCD color patch. Great care is taken to develop the appropriate shape of these color patches to minimize objectionable appearance and confusion when light leaks through the patches. With the present invention, greater flexibility is achieved by first printing the opaque black mask to define the image elements, and then printing the color patches in the desired windows of the black mask, so that alignment and color patch shapes become minimal concerns. Hence, the total number of defects when producing multicolor patches is reduced with the present invention.

Since no light leaks through the light shutter pairs when switched off, the black mask can be used instead of a gray mask, and thus a display can be provided having a true dead front. Even in low ambient lighting conditions, no light leaks through the display when switched off.

Since the secondary displays need not perform as well as the primary displays, displays which are not suitable for use as primary displays can be used as the secondary displays. This increases yield by reducing the number of displays which are discarded.

The improved LCD unit can be incorporated into a control panel having multiple displays. A common light source can be shared by plural LCD units in the single control panel so that these LCD units are illuminated equally. Additionally, a neutral density cover plate can be placed over all displays of the control panel to provide a uniform appearance which is pleasing to view and easy to read.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

Figure 1:
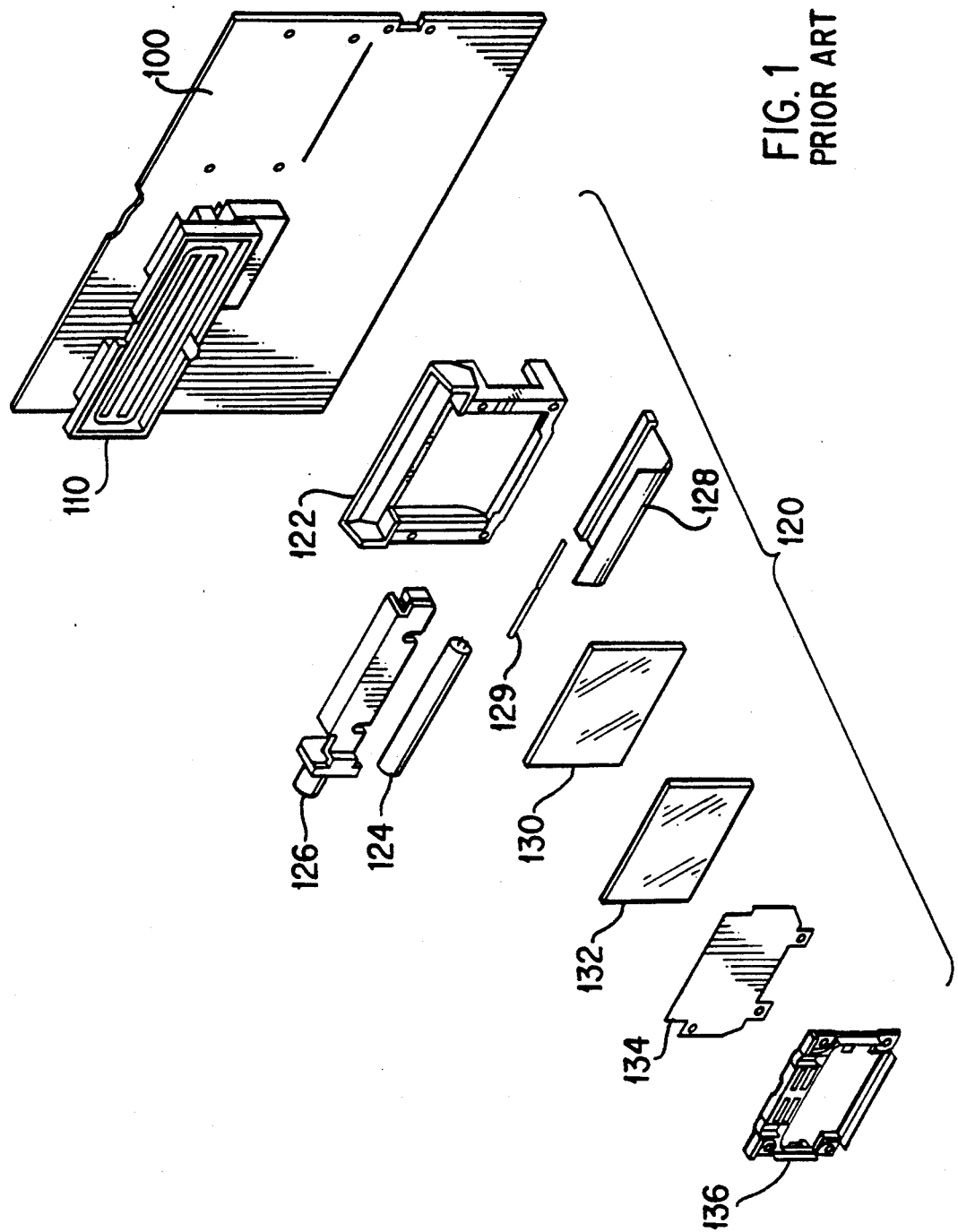
FIG. 1 is an exploded perspective view of a prior art control display including a VFD and an LCD assembly.

The present invention is an improvement over the previous 4050 liquid crystal display described above with reference to FIG. 1 and by U.S. Pat. Nos. 4,506,956 and 4,527,864 to Dir. In particular, the liquid crystal display units of the present invention provide a true dead-front, and a higher contrast ratio (i.e., the ratio between the amount of light emitted when the light shutters are turned on and the amount of light emitted when the light shutters are turned off) which enables colored text to be displayed. Accordingly, the present invention provides an improved control panel incorporating a plurality of liquid crystal display units.

Figure 2:
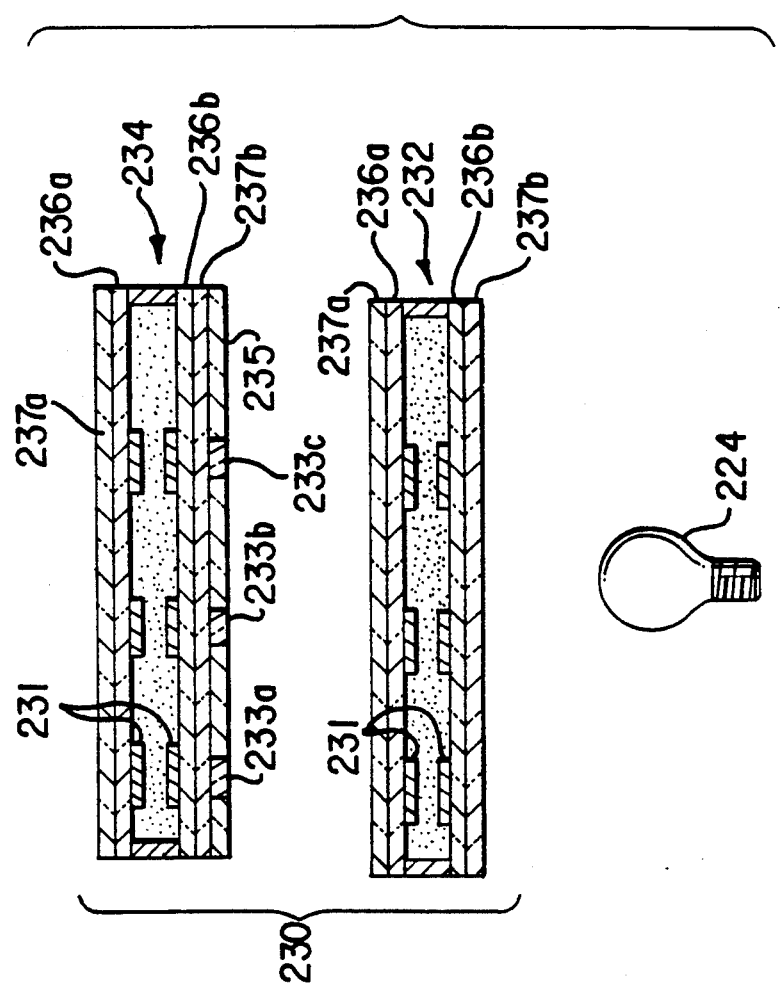
FIG. 2 is a side view of a liquid crystal display according to one embodiment of the present invention.

A liquid crystal display unit 230 according to one embodiment of the present invention is illustrated in FIG. 2. Unlike the previous 4050 display which included a single liquid crystal display glass 132, the liquid crystal display unit 230 of the present invention includes a pair of liquid crystal display glasses 232 and 234. Display glass 234 defines the shapes, colors, and sizes of the particular image elements produced by the display, and is thus referred to as the primary liquid crystal display. The second display glass 232, functions to provide a light shutter for each of the image elements defined in the primary display 234, and thus is referred to as the secondary liquid crystal display. Each image element defined by the primary display 234 has a corresponding light shutter on the secondary display 232 which is larger in size than its corresponding image element and is arranged in series relationship with that image element when the primary and secondary displays are superposed with one another.

A light source 224 is placed behind the secondary display 232. In order to activate one of the image elements, the primary display light shutter associated with that image element is opened in synchronism with the opening of the corresponding light shutter on the secondary display 232. Similarly, both of these light shutters are closed when it is not desired to view that image element. It has been found that the provision of two light shutters in series results in a cumulative light-blocking effect so that substantially no light passes through the image element when both light shutters are closed. Consequently, no light bleeds through the light shutters when closed, and thus a true dead-front can be provided. Although the amount of light which passes through the light shutter pair when open is less than that which would pass through a single light shutter, an increase in the light source intensity (if necessary) overcomes this problem. Additionally, in order to prevent light from leaking through areas of the primary liquid crystal display 234 between image elements, an opaque mask is located between each of the image elements to prevent any light bleed-through in these areas. The combination of the opaque mask and the series arrangement of light shutters thus provides a true dead front appearance.

With reference to FIG. 2, the specific structure of the liquid crystal display unit 230 will now be described. The primary liquid crystal display 234 includes a pair of glass plates 236a and 236b. A liquid crystal material is sandwiched and sealed between glass plates 236a and 236b. This liquid crystal material can be, for example, a twisted nematic material including a dichroic dye as disclosed in the above incorporated patents to Dir. One such dichroic-dye-containing-liquid crystal material is Hoffmann-LaRoche 1308. Each glass plate 236a and 236b includes corresponding sets of light shutter defining electrodes 231 formed on inner surfaces thereof. The electrodes are made from a transparent material such as, for example, indium tin oxide. The liquid crystal material operates in conjunction with a pair of polarizers (one located on each glass plate) in a conventional manner to block light from passing therethrough when in its neutral state. When an alternating current is passed between a pair of electrodes 231 on the first and second glass plates 236a, 236b the liquid crystal material located between these electrodes 231 becomes aligned to permit light to pass therethrough. Thus, each pair of electrodes 231 defines a light shutter. Each electrode pair has the same shape and size and is sized to be slightly larger than the image elements which it controls.

The glass plates 236a and 236b are separated from each other by spherical glass spacer elements (not shown). Spherical spacer elements permit less light to pass through the displays when switched off because they contact a much smaller area of glass plates 236a, 236b than the previously used cylindrical spacer elements. As disclosed in the above-incorporated patents to Dir, high contrast polarizers 237a and 237b are attached on either side of each glass plate pair. These polarizers can be, for example, Sanritsu LC₂-81 polarizers having a high extinction ratio. The structure described thus far is similar to the previous Dir liquid crystal display, except that the electrodes 231 are larger than the image elements which they control, and do not need to be the same shape as the image elements which they control. (In Dir, the electrodes define the image elements, and thus are the same size and shape as the image elements).

The secondary liquid crystal display 232 is exactly the same as the above-described structure of the primary display 234. That is, the secondary display 232 includes a pair of glass plates 236a and 236b sandwiching a twisted nematic liquid crystal material containing a dichroic dye, having pairs of electrodes 231 formed on their inner surfaces, and having polarizers 237a and 237b attached to their outer sides.

As in the liquid crystal display disclosed by Dir, color patches 233a, 233b, 233c, etc., are located on the polarizer 237b of primary display 234 to control the color of their corresponding image elements. As stated above, when the primary and secondary displays 234, 232 are superimposed so that each light shutter in the primary display 234 has a corresponding light shutter in the secondary display 232, and a pair of corresponding light shutters in the primary and secondary displays are closed, substantially no light passes through that light shutter. Accordingly, instead of using a gray surround between each of the light shutters as was done in Dir, an opaque surround (for example, a black mask) 235 is applied to the polarizer 237b of the primary display 234 around each of the light shutters of the primary display 234. This opaque mask also partially covers each light shutter (i.e., the electrode 231 associated with that light shutter) to define the size and shape of the image element.

The opaque black mask can be formed on polarizer 237b by a photographic process, by screen printing, or by offset lithography techniques suitable for printing accurately on plastic. As with the color patches, it is preferable to form the black mask on the light input side of primary display 234. Since the black mask usually has some texture, it may be conspicuous to users if formed on primary display polarizer 237a. However, if it is not important in a particular application that the mask texture be inconspicuous, or if some other technique is used which does not form a textured mask, the mask can be formed on the viewable side of primary display 234. The color patches can be screen printed on polarizer 237b, or formed thereon using a photographic process. The color patches should be formed on the light input side of primary display 234 (verses polarizer 237a), otherwise the outline of the color patches would be conspicuous to users of the device.

The opaque mask 235 prevents any light from bleeding through the primary liquid crystal display 234 between each of the image elements. Accordingly, when all of the light shutters are closed, a true dead-front appearance is provided. The particular arrangement of the opaque mask provides a number of additional advantages. Since the opaque mask 235 defines the image elements, the image elements have a size which is smaller than the light shutters defined by the electrodes 231 of the secondary display 232. Thus, it is easy to align the secondary and primary displays. If the light shutters on the secondary display 232 were the same size and shape as the image elements on the primary display 234, great care would be required to ensure that the light shutters of the secondary display 232 were precisely aligned with the image elements defined on the primary display 234 so that parallax would not occur. Additionally, since the opaque mask 235 (not the electrodes) defines the image elements, the glass plates 236a and 236b used to form the primary and secondary displays 234, 232 can be produced by the same manufacturing process. In fact, secondary display 232 is exactly the same as the primary display 234 except for the color patches 233a–c and opaque mask 235. This reduces manufacturing costs and also permits liquid crystal displays which are unsuitable for use as primary displays 234 to be used as secondary displays 232. This greatly increases yield by reducing the number of displays which must be discarded.

Prior to placing color patches and the opaque mask on a display, the display is tested to determine whether it is suitable for use as a primary display. For example, the maximum color fringe acceptance of the display can be relaxed for the secondary displays as compared to the primary displays. Color fringes are known in the art, and are color blotches which appear on the display. (This is similar to the effect which occurs when drops of oil are placed in water.) Color fringes usually result from variations in the separation between the inner surfaces of the glass plates 236a, 236b. A display suitable for use as the primary display 234 should have no color fringes since they would be readily apparent to a user. However, the maximum color fringe acceptance can be relaxed for the secondary display 232. Small color fringes are acceptable in the light shutter areas of the secondary display, while larger color fringes are acceptable between electrodes of the secondary display 232 (due to the opaque mask 235 on primary display 234). Additionally, minor defects in the inter-electrode areas of the display can be tolerated in the secondary displays because of the opaque mask 235 applied to these areas of the primary display. Further, minor blemishes in the electrode areas not acceptable in the primary displays, are acceptable in the secondary displays. The amount of color fringes and other defects which are acceptable in the secondary displays are determined by visual inspection.

Figure 3:
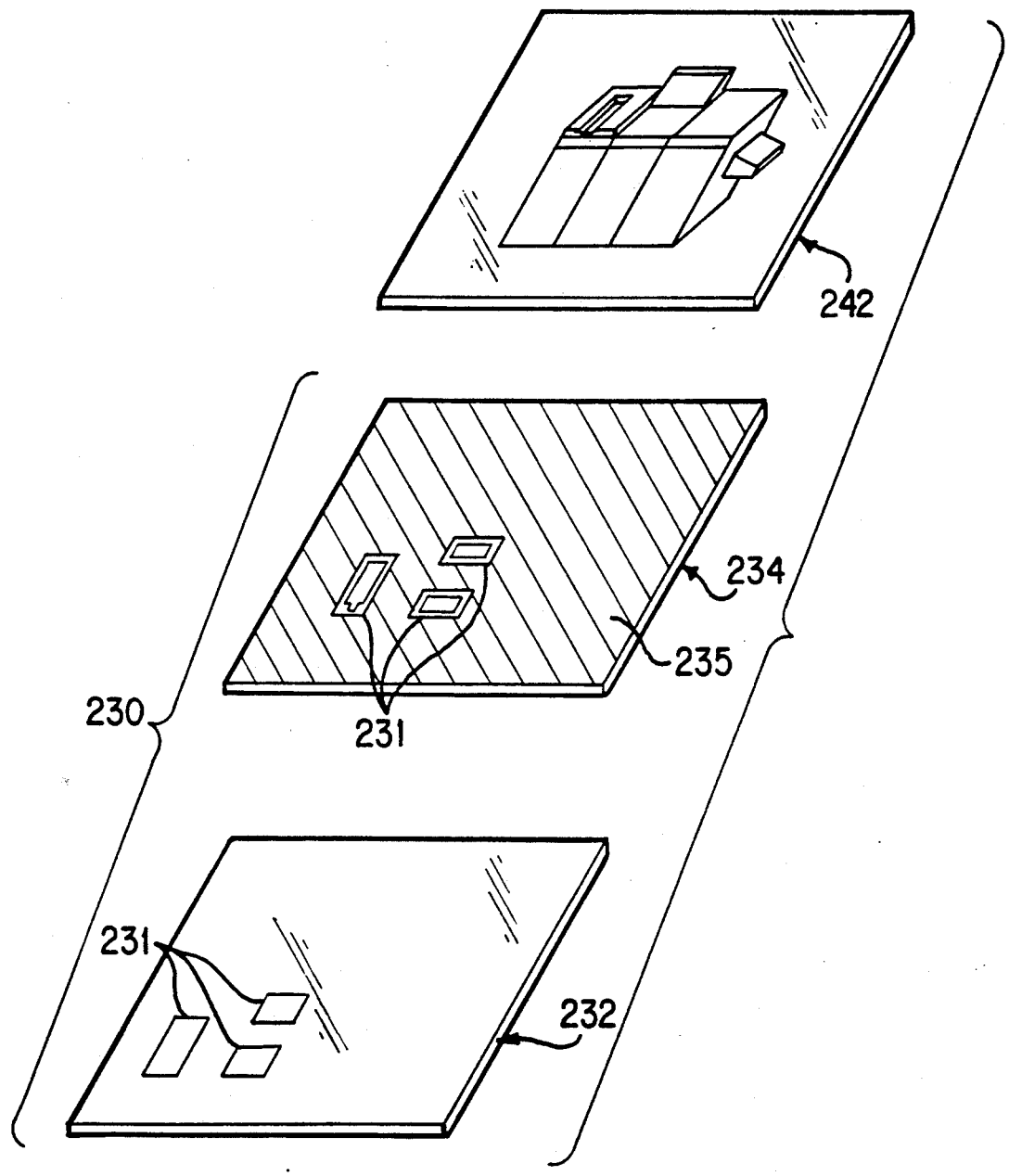
FIG. 3 is an exploded perspective view of a liquid crystal display according to an embodiment of the present invention used with an overlay depicting a copier and illustrating the manner in which the opaque black mask partially covers the primary display light shutters to define an image element.

FIG. 3 is an exploded view of the liquid crystal display unit 230 incorporated in a display which illustrates various components of a copier. FIG. 3 illustrates the manner in which the opaque mask partially covers each of the electrodes 231 on the primary display 234. (The opaque mask 235 is shown to be located on the side of the display 234 which faces away from secondary display 232 for purposes of illustration only. As illustrated in FIG. 2, the opaque mask and color patches are preferably located on the side of primary display 234 which faces towards secondary display 232.) The image elements are components of a copier machine, the outline of which is provided on an overlay 242. Overlay 242 can be made from, for example, transparent mylar, and includes the outline of the copier in white thereon. The opaque mask 235 defines a toner container image element and two paper tray image elements. It is, of course, understood that a large variety of additional image elements are also provided on primary display 234.

While the opaque black mask actually defines the size and shape of the image elements, the electrodes 231 are still generally considered to be "mimic" type electrodes because there is only a single electrode pair (one electrode on each glass plate 236a, 236b) which defines each large (multi-bit) image element. This is important in that relatively simple, inexpensive driving circuitry is required to drive mimic electrodes.

Figure 4:
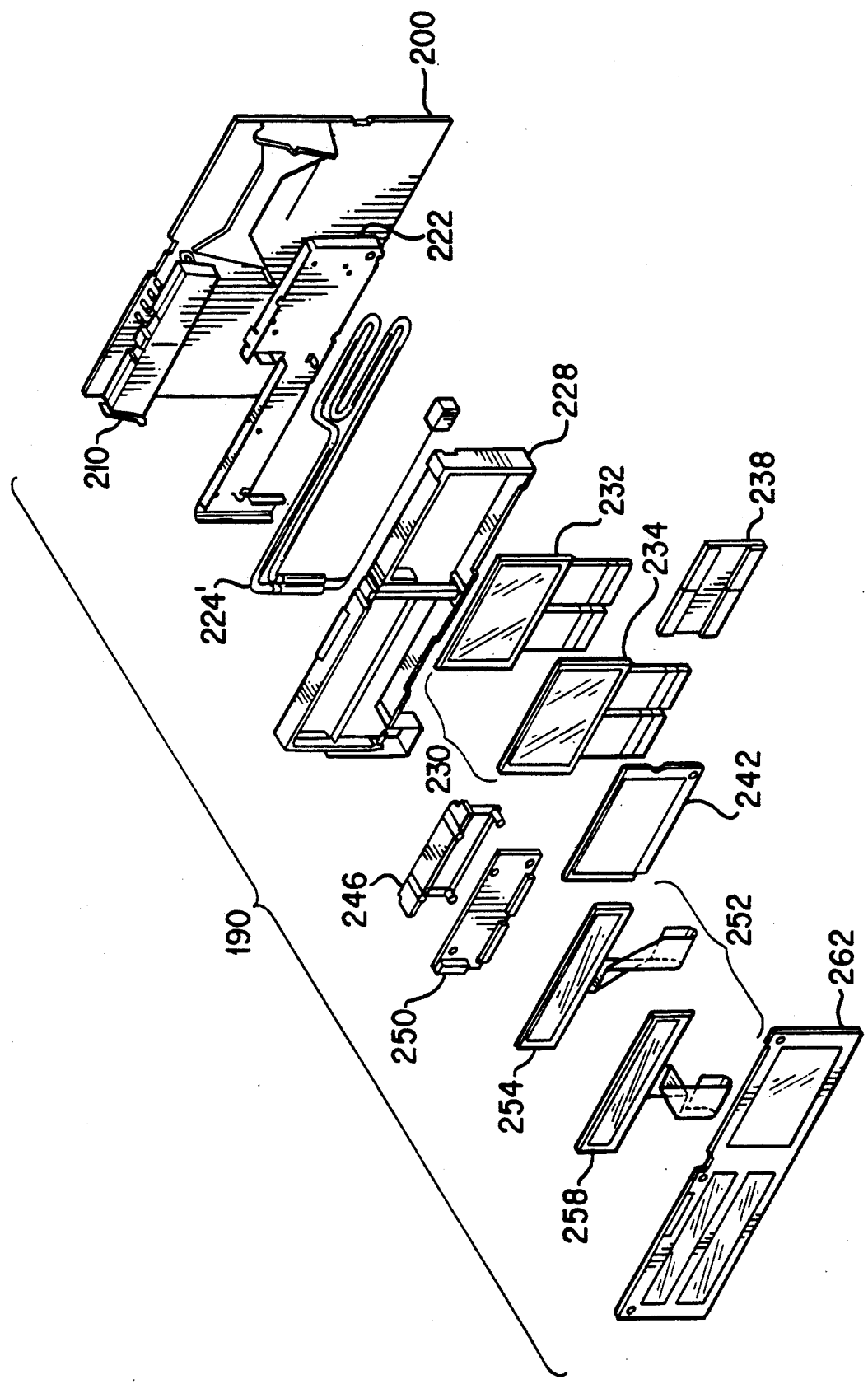
FIG. 4 is an exploded perspective view of a copier control panel according to an embodiment of the present invention which includes a VFD, two LCD assemblies, and a common light source shared by each LCD assembly.

FIG. 4 is an exploded view of the improved control panel 190 which includes two liquid crystal display units manufactured according to the teachings of the present invention, and a VFD. The control panel includes three display areas: one which includes a VFD 210, a second which includes an LCD unit 230, and a third which includes an LCD unit 252 different from LCD unit 230. The control panel 190 according to FIG. 4 can be assembled without any tools by providing snap-type connections between the appropriate components. The control panel includes a mounting board 200 having a VFD 210 attached thereto. A common back plate housing and light reflector 222 for both of the liquid crystal display units 230, 252 is snap-fitted to the mounting board 200. A specially designed fluorescent lamp 224' functions as a light source for both of the liquid crystal display units 230, 252 and is snap-fitted onto back plate housing 222. The provision of a single light source results in uniform back lighting throughout each liquid crystal display unit and between both units. A common side housing 228 for the VFD and for both of the LCD units snap-fits onto back plate housing 222. The secondary liquid crystal display 232 of the first LCD unit and the primary liquid crystal display 234 of the first LCD unit are loosely placed in the appropriate portion of common side housing 228. Similarly, the secondary liquid crystal display 254 of the second LCD unit and the primary liquid crystal display 258 of the second LCD unit are loosely placed in their appropriate portion of common side housing 228. Optionally, a light diffuser plate can be placed between the light source and each LCD unit 230, 252. If the light source provides a sufficiently uniform appearance when each element is activated, then a diffuser might not be required; this of course depends on the sensitivity of the application. If required, a low cost diffuser can easily be printed on the secondary LCD. A translucent printing on the light input side of the secondary LCD will provide maximum diffusion without the need for a separate item used as a diffuser. Color can be added to further customize the appearance.

Each of the liquid crystal displays 232, 234, 254 and 258 include tape cables which are integrally bonded thereto, thus eliminating the need for zebra strips. An interface card 238 connects tape cables from displays 232 and 234 to one another and to their common control electronics. Interface card 238 is optional since the cables from each display 232 and 234 could be directly attached to its controls.

An overlay 242, including the outline of the copier is then placed over the primary display 234 of LCD unit 230. A common neutral density cover window 262 is placed over all three displays (VFD 210, LCD unit 230 and LCD unit 252). The neutral density cover 262 includes a flat black frame between each of the display areas or windows, and is tinted black in the display areas. Each of the three windows is tinted black so that the brightness of each display is about equal, and so that glare is minimized. In particular, the brightness of the VFD must be reduced so as to be closer to the LCD brightness. The black tint is flat across the entire light spectrum so that the intensity of any particular color is not reduced. The cover window 262 snap fits onto common housing 228 to maintain displays 232, 234, 254, 258 and overlay 242 in place on the control panel.

Additionally, an ICON display driver printed wire board assembly 250 which provides signals to displays 254 and 258 is mounted to housing 228 (below the display areas) by an ICON display board support 246.

Figure 5:
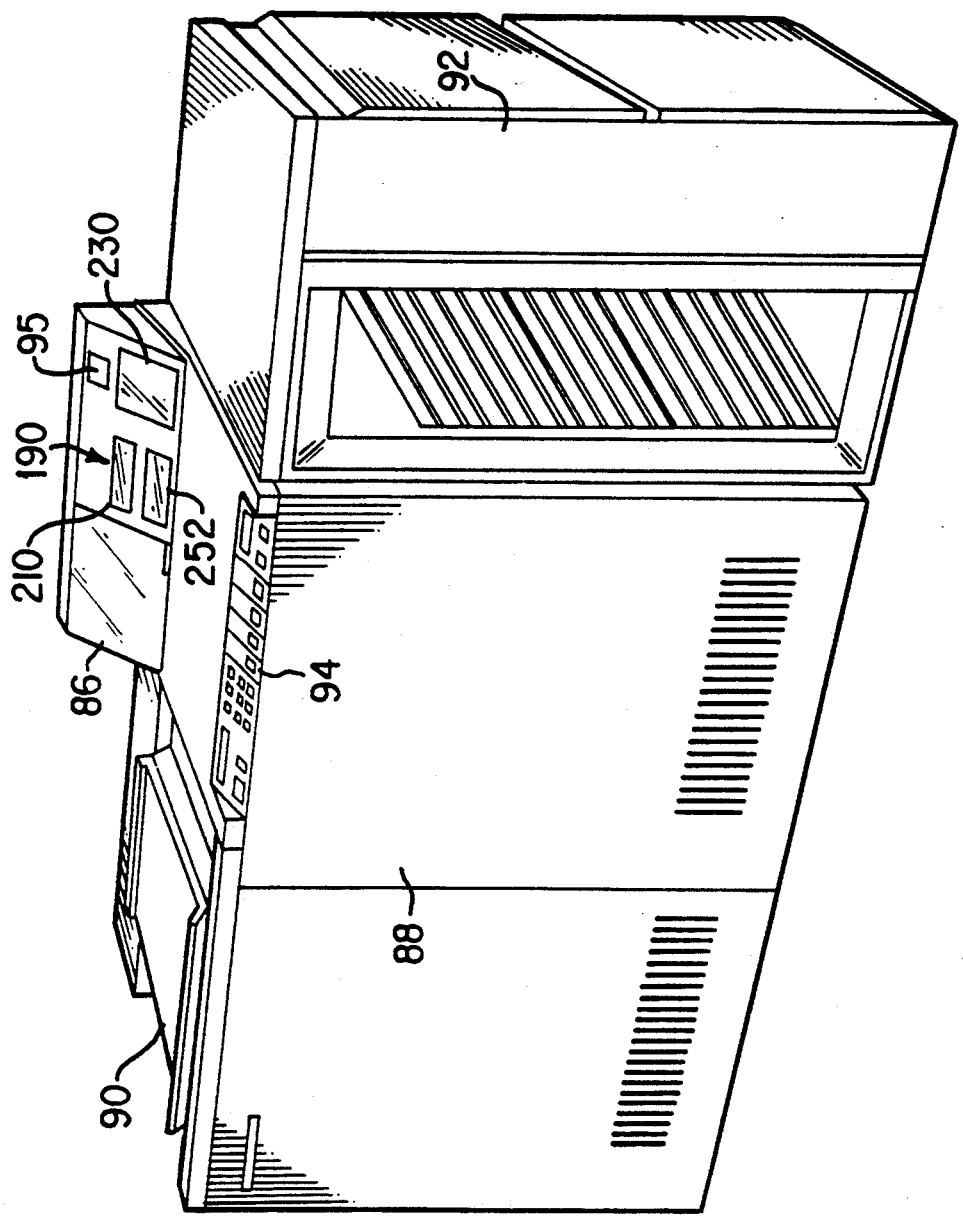
FIG. 5 is a schematic of a xerographic copier with which the present invention has utility.

The present invention relates to a multicolor liquid crystal display which presents a uniformly dark state or dead front during the off-state and has particular utility for use in automotive instrument panels and office equipment such as xerographic printers and copiers. FIG. 5 shows an example of the use of two multicolor liquid crystal display units 230,252 in a copier 80. The multicolor display units cooperate with alphanumeric vacuum fluorescent display 210 to efficiently prompt the user regarding copier status, inform him of certain faults as they occur, and refer the user to flip charts 86 in the event that instructions to be given require more detail than can be conveniently displayed on the multicolor LCD 230 and alphanumeric display 210. Refer to U.S. Pat. No. 4,475,806 to John W. Daughton et al for operational and electronic interface details between a copier microprocessor and a multicolor LCD.

The copier 80 includes a housing 88 which provides an attractive appearance and covers typical copier components and subassemblies. The particular copier 80 schematically illustrated includes a platen and platen cover 90. The platen cover 90 is hinged to allow the user to raise and lower the cover 90 and insert original documents onto the platen (not shown) for copying. The copier 80 also includes a sorter 92 which provides collated copy sets of multiple document originals. A control panel 94 allows a user to select copy size, copy contrast, number of copies to be made, and the manner in which the copies are to be made (e.g., duplex or simplex copies). The panel 190 having the multicolor liquid crystal displays also includes a button 95 for starting the copying operation.

As the user approaches the copier 80 both the LCDs 230,252 and alphanumeric display 210 are blank and can display nothing until the user activates the "Power On" switch 95 to energize the power supply inside the copier 80. Once the power has been turned on, a "Standby" message will appear on the alphanumeric display 210 indicating the copier is not yet ready for use. Once the copier 80 is ready for making xerographic copies, the alphanumeric display 210 shows a "Ready to Make Copies" message telling the user that the copier 80 is ready for operation.

Figure 6:
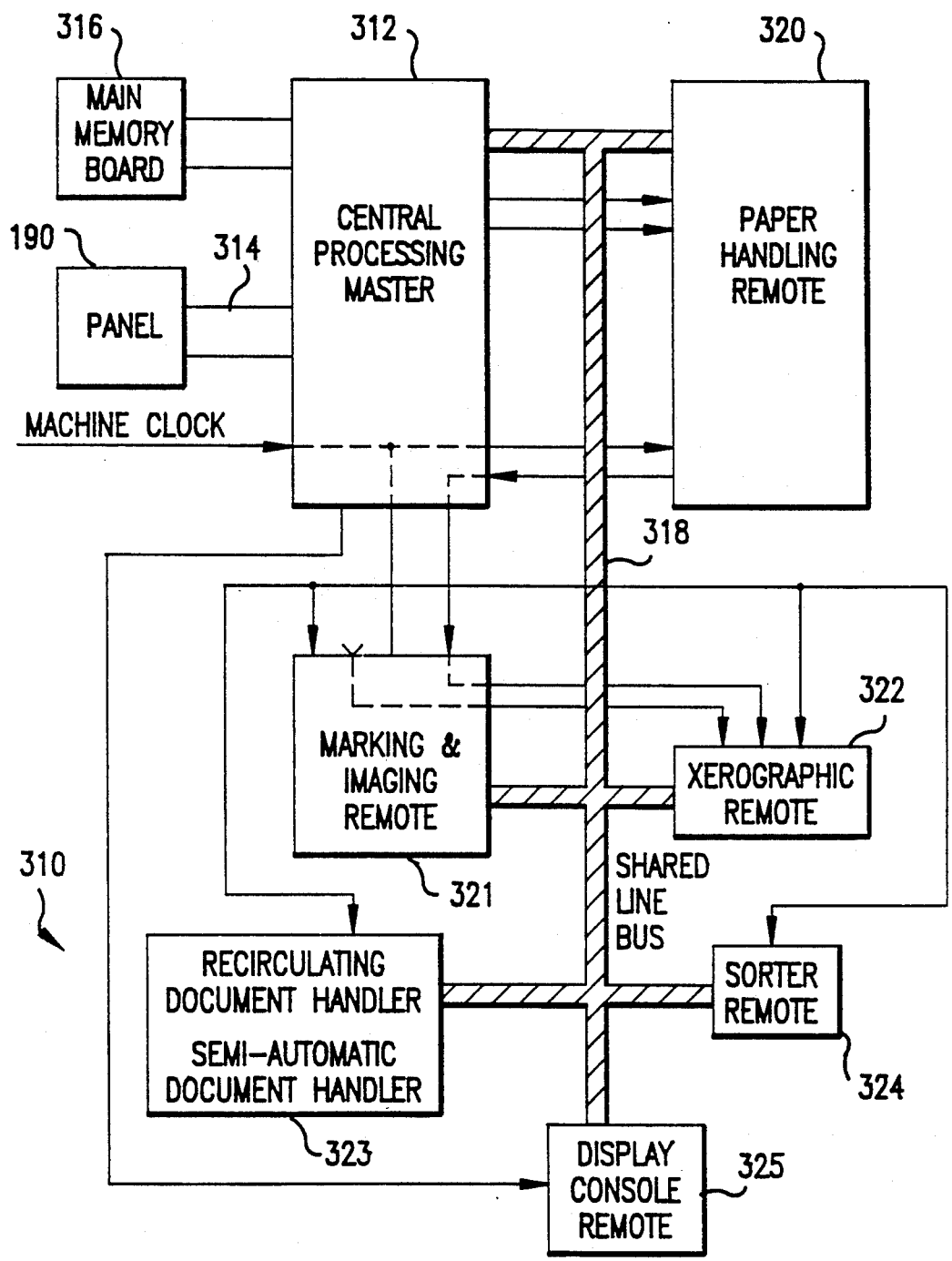
FIG. 6 is a schematic of the electronics used to both control and monitor xerographic functions inside the copier of FIG. 5.

The functioning of the components comprising the copier 80 is controlled and monitored by an electronics subsystem 310 (FIG. 6) comprising a number of programmable controllers which communicate with a master central processor 312. An interface 314 between the panel 190 and main processor 312 apprises the processor 312 of inputs entered by the user regarding number of copies, etc. The main processor 312 responds to user inputs by executing its operating system stored in a main memory unit 316.

The algorithm in main memory 316 causes the master central processor 312 to communicate along a communications bus 318 to a number of remote electronics units 320–325 used to monitor and control the copier.

The LCD units 230, 252 and the alphanumeric (vacuum fluorescent) display 210, PWBA 250, and all elements of the control panel assembly are housed in the display console remote unit 325. The display console remote unit 325 receives status information, fault information, or program control information from main processor 312 and then displays an appropriate message on the alphanumeric display 210, and if appropriate, energizes one of a plurality of liquid crystal segments (light shutters) on multicolor LCD unit 230. (Note that the corresponding pair of light shutters on primary display 234 and secondary display 232 receive the same signal at the same time to permit light from source 224' to pass therethrough). The specific units 320–325 vary with copier architecture so the FIG. 6 schematic is representative of one of many possible electric subsystem schematics. Each unit 320–325 has its own microprocessor with accompanying memory (both RAM and ROM) and support circuitry.

LCD unit 252 informs the user of the user selected operating mode in which the copier is operating. For example, the LCD unit 252 indicates the selected printer mode, and color. For example, the LCD unit 252 indicates whether the copier is operating in "highlight red" mode, "highlight green" mode, or "black only" mode, etc. It should be noted that due to the superior performance of LCD units constructed in accordance with the present invention, colored textual data can be displayed with an LCD having "mimic" type electrodes. This could not be accomplished in the previous 4050 LCD design.

The specific use of the present invention in a copier environment discussed above was only for purposes of illustrating a particular use and was not intended as an only use. To the contrary, the present invention is important for many different environments.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A liquid crystal display unit comprising:
   a primary liquid crystal display including one or more light shutters and a pair of polarizers arranged on each side of said one or more light shutters, each light shutter including a liquid crystal material disposed between two opposed electrodes.
   a secondary liquid crystal display having an identical structure and identical materials as those of said primary liquid crystal display, said secondary liquid crystal display having a quality of optical characteristics being less than that of said primary liquid crystal;
   said primary and secondary liquid crystal displays being superposed on each other so that the light shutters of said primary and secondary liquid crystal displays are in series;
   each light shutter of said primary liquid crystal display having a color patch located thereon;
   an opaque mask also located on said primary liquid crystal display in all areas between light shutters, and partially overlapping each light shutter so as to define an image pattern to be projected through each light shutter; and
   a light source located adjacent to said secondary liquid crystal display for emitting light through the light shutters of the secondary and primary liquid crystal displays when said light shutters are in an open state.

2. The liquid crystal display unit according to claim 1, wherein said secondary liquid crystal display includes a greater number of color fringes than said primary liquid crystal display.

3. The liquid crystal display unit according to claim 1, wherein areas between the light shutters of said secondary liquid crystal display include defects, whereas areas between the light shutters of said primary liquid crystal display do not include said defects.

4. The liquid crystal display unit according to claim 1, wherein the light shutters of said secondary liquid crystal display include blemishes, whereas the light shutters of said primary liquid crystal display do not include said blemishes.

5. A liquid crystal display unit comprising:
   a primary liquid crystal including one or more light shutters and a pair of polarizers arranged on each side of said one or more light shutters;
   a secondary liquid crystal display having an identical structure and identical materials as those of said primary liquid crystal display, said secondary liquid crystal display having a quality of optical characteristics being less than that of said primary liquid crystal display;
   said primary and secondary liquid crystal displays being superposed on each other so that the light shutters of said primary and secondary liquid crystal displays are in series;

each light shutter of said primary liquid crystal display having a color patch located thereon;

an opaque mask also located on said primary liquid crystal display in all areas between light shutters, and partially overlapping each light shutter so as to define an image pattern to be projected through each light shutter, each light shutter in said primary and said secondary liquid crystal displays including a liquid crystal material disposed between a pair of mimic-type electrodes, each pair of mimic-type electrodes having an area larger than an area of the image pattern to be projected through the light shutter corresponding to the pair of mimic-type electrodes, the image pattern defined by the opaque mask for each light shutter defining a multi-bit image element having a distinctive shape; and a light source located adjacent to said secondary liquid crystal display for emitting light through the light shutters of the secondary and primary liquid crystal displays when said light shutters are in an open state.

6. The liquid crystal display unit of claim 5, wherein said opaque mask is black.

7. The liquid crystal display unit of claim 5, wherein said color patches and said opaque mask are attached to a polarizer of said primary liquid crystal display which is located on a side of said light shutters closest to said secondary liquid crystal display.

8. The liquid crystal display unit of claim 5, wherein said superposed primary and secondary liquid crystal displays are incorporated in a larger display panel having multiple display areas and a common neutral density filter overlay.

9. The liquid crystal display unit of claim 8, wherein said larger display includes three display areas, said liquid crystal display unit located in one of said display areas, a second set of superposed primary and secondary liquid crystal displays having a light shutter pattern different from a light shutter pattern of said liquid crystal display unit being located in said secondary display area, and an alphanumeric vacuum florescent display being located in said third display area.

10. The liquid crystal display unit of claim 8, wherein said larger display panel includes at least two display areas, each of said at least two display areas containing a pair of superposed primary and secondary liquid crystal displays having light shutter patterns which differ and sharing a common light source.

11. The liquid crystal display unit of claim 5, wherein said secondary liquid crystal display is not suitable for use as said primary liquid crystal display due to defects therein.

12. The liquid crystal display unit of claim 5, wherein said opaque mask defines image patterns in the shape of text.

13. The liquid crystal display unit of claim 5, wherein said opaque mask is black and is formed directly on a polarizer of said primary liquid crystal display that is located on a side of said light shutters closest to said secondary liquid crystal display, and said color patches are formed over said black opaque mask.

14. A display panel comprising:
A) a first display area having a liquid crystal display unit including:
   a primary liquid crystal display including one or more light shutters and a pair of polarizers arranged on each side of said one or more light shutters;
   a secondary liquid crystal display including light shutters equal in number, size, and location to the light shutters on said primary liquid crystal display, and a pair of polarizers arranged on each side of said light shutters;
   said primary and secondary liquid crystal displays being superposed on each other so that the corresponding light shutters are in series;
   each light shutter of said primary liquid crystal display having a color patch located thereon;
   an opaque mask also located on said primary liquid crystal display in all areas between light shutters, and partially overlapping each light shutter so as to define an image pattern to be projected through each light shutter; and
   a light source located adjacent to said secondary liquid crystal display for emitting light through the light shutters of the secondary and primary liquid crystal displays when said light shutters are in an open state;
B) a second display area having a second display unit therein; and
C) a common neutral density filter overlay that covers said display panel including said first display area, said second display area, and areas between said first display area and said second display area, said common neutral density filter being tinted so that images displayed by said liquid crystal display unit and by said second display unit have substantially equal brightnesses when viewed through said common neutral density filter.

15. The display panel according to claim 14, wherein said second display unit is an alphanumeric vacuum fluorescent display.

16. The display panel according to claim 14, wherein said second display unit is a second liquid crystal display unit containing a second pair of superposed primary and secondary liquid crystal displays having image patterns that differ from the image patterns of said first liquid crystal display unit, said second liquid crystal display unit sharing a common light source with said first liquid crystal display unit.

17. The display panel according to claim 16, wherein the image patterns of said second liquid crystal display unit are in the shape of text.

* * * * *